US009430076B2

(12) United States Patent
Chen et al.

(10) Patent No.: US 9,430,076 B2
(45) Date of Patent: Aug. 30, 2016

(54) DRIVING CIRCUIT AND TOUCH DISPLAY CAPABLE OF ENABLING A DISPLAY STRUCTURE TO PROVIDE A TOUCH FUNCTION

(71) Applicant: Rich IP Technology Inc., Taipei (TW)

(72) Inventors: Han-Chang Chen, Taipei (TW); Yen-Hung Tu, Taipei (TW); Chung-Lin Chia, Taipei (TW); Chih-Wen Wu, Taipei (TW)

(73) Assignee: RICH IP TECHNOLOGY INC., Taipei (TW)

( * ) Notice: Subject to any disclaimer, the term of this patent is extended or adjusted under 35 U.S.C. 154(b) by 581 days.

(21) Appl. No.: 13/777,574

(22) Filed: Feb. 26, 2013

(65) Prior Publication Data

US 2014/0160058 A1 Jun. 12, 2014

(30) Foreign Application Priority Data

Dec. 12, 2012 (TW) .............................. 101146797 A

(51) Int. Cl.
*G09G 3/36* (2006.01)
*G06F 3/044* (2006.01)
*G06F 3/041* (2006.01)

(52) U.S. Cl.
CPC ............. *G06F 3/0412* (2013.01); *G06F 3/044* (2013.01); *G06F 3/0416* (2013.01)

(58) Field of Classification Search
CPC ..... G06F 3/0416; G06F 3/044; G06F 3/0412
USPC ................................................. 345/104, 174
See application file for complete search history.

(56) References Cited

U.S. PATENT DOCUMENTS

| 8,031,180 B2 * | 10/2011 | Miyamoto ............ G06F 3/0412 345/156 |
| 2005/0212916 A1 * | 9/2005 | Nakamura ............ G06F 3/0412 348/207.99 |
| 2010/0110040 A1 * | 5/2010 | Kim et al. ..................... 345/174 |
| 2011/0025635 A1 * | 2/2011 | Lee ........................ G06F 1/3203 345/173 |
| 2011/0102360 A1 * | 5/2011 | Chen et al. ................... 345/173 |
| 2011/0141042 A1 * | 6/2011 | Kim .................... G02F 1/13338 345/173 |
| 2011/0216039 A1 * | 9/2011 | Chen ..................... G06F 3/0412 345/174 |
| 2012/0162088 A1 * | 6/2012 | van Lieshout et al. ...... 345/173 |
| 2012/0182255 A1 * | 7/2012 | Kuang et al. ................. 345/174 |
| 2013/0082954 A1 * | 4/2013 | Azumi et al. ................. 345/173 |

* cited by examiner

*Primary Examiner* — Amr Awad
*Assistant Examiner* — Stephen Bray
(74) *Attorney, Agent, or Firm* — Ming Chow; Sinorica, LLC

(57) ABSTRACT

A driving circuit capable of enabling a display structure to provide a touch function, including: a first multiplexing interface for coupling with multiple gate driving lines; a second multiplexing interface for coupling with at least one storage capacitor driving line; a third multiplexing interface for coupling with multiple source driving lines; a fourth multiplexing interface for coupling with multiple transparent electrodes; and a control unit for driving the gate driving lines via the first multiplexing interface to form a capacitive network on a TFT display structure, and performing a capacitive touch detection procedure on the capacitive network via an interface selected from a group consisting of the second multiplexing interface, the third multiplexing interface, the fourth multiplexing interface, and any combination thereof.

6 Claims, 10 Drawing Sheets

DRIVING CIRCUIT AND TOUCH DISPLAY CAPABLE OF ENABLING A DISPLAY STRUCTURE TO PROVIDE A TOUCH FUNCTION

The current application claims a foreign priority to the patent application of Taiwan No. 101146797 filed on Dec. 12, 2012.

BACKGROUND OF THE INVENTION

1. Field of the Invention

The present invention relates to a driving circuit for a touch display, especially to a driving circuit capable of enabling a display structure to provide a touch function.

2. Description of the Related Art

General touch screen apparatuses have a touch module stacked on a liquid crystal screen, wherein the liquid crystal screen uses a gate driver integrated circuit and a source driver integrated circuit to drive a liquid crystal display structure, and the touch module uses a touch detection circuit to detect touch events. However, this kind of touch screen apparatuses tends to have larger depths, which can fail to meet the market requirements on lightness and thinness, and can result in higher material cost.

To cope with this issue, one solution is to integrate two layers of same material, one of which comes from a liquid crystal screen and the other of which comes from a touch module, into one layer. However, the depth of a touch screen apparatus reduced by this kind of designs still cannot meet the requirements of some high end products.

Another solution is to integrate a touch function into a liquid crystal display, generally by adding extra electrodes on a thin film transistor layer to form touch capacitors. However, this kind of designs tends to reduce product yield rate and increase manufacturing cost.

Still another solution is to integrate a display driving controller and a touch driving controller into a single chip so as to save space. Please refer to FIG. 1, which illustrates a touch/display architecture using a prior art touch/display integrated controller. As illustrated in FIG. 1, a touch/display integrated controller 100 is connected with a display array 110, a touch array 120, and a central processing unit 130 respectively. The touch/display integrated controller 100 is used to receive display data $D_{IMAGE}$ from the central processing unit 130, and drive the display array 110 to display an image via a gate driving output port G and a source driving output port S; and detect a touch event on the touch array 120 via a set of scan lines X and a set of scan lines Y, and transmit detected touch data $D_{TOUCH}$ to the central processing unit 130. However, this arrangement has limit effect for reducing the depth of a touch screen apparatus.

To solve the foregoing problems, a driving circuit capable of enabling a display structure to provide both a touch function and a display function and thereby facilitate a slim and easy-to-manufacture touch screen apparatus is needed.

SUMMARY OF THE INVENTION

One objective of the present invention is to disclose a driving circuit capable of enabling a liquid crystal display structure to provide a display function and a touch function alternatively.

Another objective of the present invention is to disclose a driving circuit capable of executing a self-capacitor touch detection procedure or a mutual-capacitor touch detection procedure on a liquid crystal display structure.

Another objective of the present invention is to disclose a driving circuit capable of executing a multi-stage touch detection procedure on a liquid crystal display structure so as to reduce touch detection time.

Still another objective of the present invention is to disclose a driving circuit capable of enabling a liquid crystal display structure to provide a display function and a touch function alternatively so as to reduce the depth, promote yield rate, and cut down the cost of a touch screen apparatus.

To attain the foregoing objectives, a driving circuit capable of enabling a display structure to provide a touch function is proposed, the driving circuit including:

a first multiplexing interface for coupling with a plurality of gate signal lines;

a second multiplexing interface for coupling with a plurality of source signal lines;

a third multiplexing interface for coupling with a plurality of transparent electrode signal lines; and a control unit for driving the gate signal lines via the first multiplexing interface to form a capacitive network on a TFT display structure, and performing a capacitive touch detection procedure on the capacitive network via an interface selected from a group consisting of the second multiplexing interface, the third multiplexing interface, and any combination thereof.

In one embodiment, the driving circuit capable of enabling a display structure to provide a touch function further includes a fourth multiplexing interface for coupling with at least one storage capacitor signal line, and the control unit further uses the fourth multiplexing interface to execute the capacitive touch detection procedure.

In one embodiment, the driving circuit capable of enabling a display structure to provide a touch function further includes an output port for transmitting touch detection data to a central processing unit.

In one embodiment, the driving circuit capable of enabling a display structure to provide a touch function further includes an input port for receiving display data from the central processing unit.

In one embodiment, the driving circuit capable of enabling a display structure to provide a touch function further includes a communication port for communicating with the central processing unit.

In one embodiment, the control unit includes:

a gate driver unit coupled with the first multiplexing interface;

a pixel driver unit coupled with the second multiplexing interface;

a capacitive touch driver unit coupled with the second multiplexing interface, the third multiplexing interface, and the fourth multiplexing interface respectively; and a timing control unit coupled with the gate driver unit, the pixel driver unit, and the capacitive touch driver unit respectively.

In one embodiment, the capacitive touch detection procedure is one procedure selected from a group consisting of a self-capacitive touch detection procedure, a mutual-capacitive touch detection procedure, and any combination thereof.

To attain the foregoing objectives, a touch display using a display structure to provide a touch function is proposed, the touch display including:

a TFT display structure having a plurality of gate driving lines, at least one storage capacitor driving line, a plurality of source driving lines, and a plurality of transparent electrodes, wherein the transparent electrodes oppose a plurality of pixel electrodes, and a display material layer is located between the transparent electrodes and the pixel electrodes; and a driving circuit, including:

a gate driver unit coupled with the gate driving lines;

a touch/display driver assembly having a plurality of touch/display driver units connected in series, each of the touch/display driver units having:

a second multiplexing interface coupled with the source driving lines; and a third multiplexing interface coupled with the transparent electrodes; and a control unit using the gate driver unit to drive the gate driving lines to form a capacitive network on the TFT display structure, and using the touch/display driver assembly to perform a capacitive touch detection procedure on the capacitive network.

In one embodiment, each of the touch/display driver units further includes a fourth multiplexing interface for coupling with at least one storage capacitor driving line.

In one embodiment, the driving circuit further includes an output port for transmitting touch detection data to a central processing unit.

In one embodiment, the driving circuit further includes an input port for receiving display data from the central processing unit.

In one embodiment, the driving circuit further includes a communication port for communicating with the central processing unit.

In one embodiment, the control unit has a timing control unit coupled with the gate driver unit and the touch/display driver assembly respectively.

In one embodiment, the capacitive touch detection procedure is a multi-stage detection procedure having multiple sub procedures, and each of the sub procedures is one procedure selected from a group consisting of a self-capacitive touch detection procedure, a mutual-capacitive touch detection procedure, and any combination thereof.

In one embodiment, the display material layer is a liquid display layer or an electronic paper display layer.

In one embodiment, the first multiplexing interface, the second multiplexing interface, and the third multiplexing interface are located on an integrated circuit.

In one embodiment, the first multiplexing interface, the second multiplexing interface, and the third multiplexing interface are located on the TFT display structure.

To attain the foregoing objectives, another driving circuit capable of enabling a display structure to provide a touch function is proposed, the driving circuit including:

a first multiplexing interface for coupling with a plurality of gate signal lines;

a second multiplexing interface for coupling with a plurality of source signal lines;

a third multiplexing interface for coupling with a plurality of transparent electrodes; and a control unit for driving the gate signal lines via the first multiplexing interface to form a capacitive network on a TFT display structure, and performing a capacitive touch detection procedure on the capacitive network via an interface selected from a group consisting of the second multiplexing interface, the third multiplexing interface, and any combination thereof, the control unit including:

a gate driver unit coupled with the first multiplexing interface;

a pixel driver unit coupled with the second multiplexing interface;

a capacitive touch driver unit coupled with the second multiplexing interface and the third multiplexing interface respectively; and a digital to analog conversion unit for providing a first analog voltage to the pixel driver unit, and a second analog voltage to the capacitive touch driver unit.

In one embodiment, the driving circuit capable of enabling a display structure to provide a touch function further includes an output port for transmitting touch detection data to a central processing unit.

In one embodiment, the driving circuit capable of enabling a display structure to provide a touch function further includes an input port for receiving display data from the central processing unit.

In one embodiment, the driving circuit capable of enabling a display structure to provide a touch function further includes a communication port for communicating with the central processing unit.

In one embodiment, the control unit further includes a timing control unit coupled with the gate driver unit, the pixel driver unit, and the capacitive touch driver unit respectively.

In one embodiment, the capacitive touch detection procedure is one procedure selected from a group consisting of a self-capacitive touch detection procedure, a mutual-capacitive touch detection procedure, and any combination thereof.

In one embodiment, the first analog voltage differs from a common voltage by a first voltage difference, and an absolute value of the first voltage difference ranges between a first voltage and a second voltage; and the second analog voltage differs from the common voltage by a second voltage difference, and an absolute value of the second voltage difference ranges between a third voltage and a fourth voltage, wherein the second voltage is higher than the first voltage, and the fourth voltage is higher than the third voltage.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1:
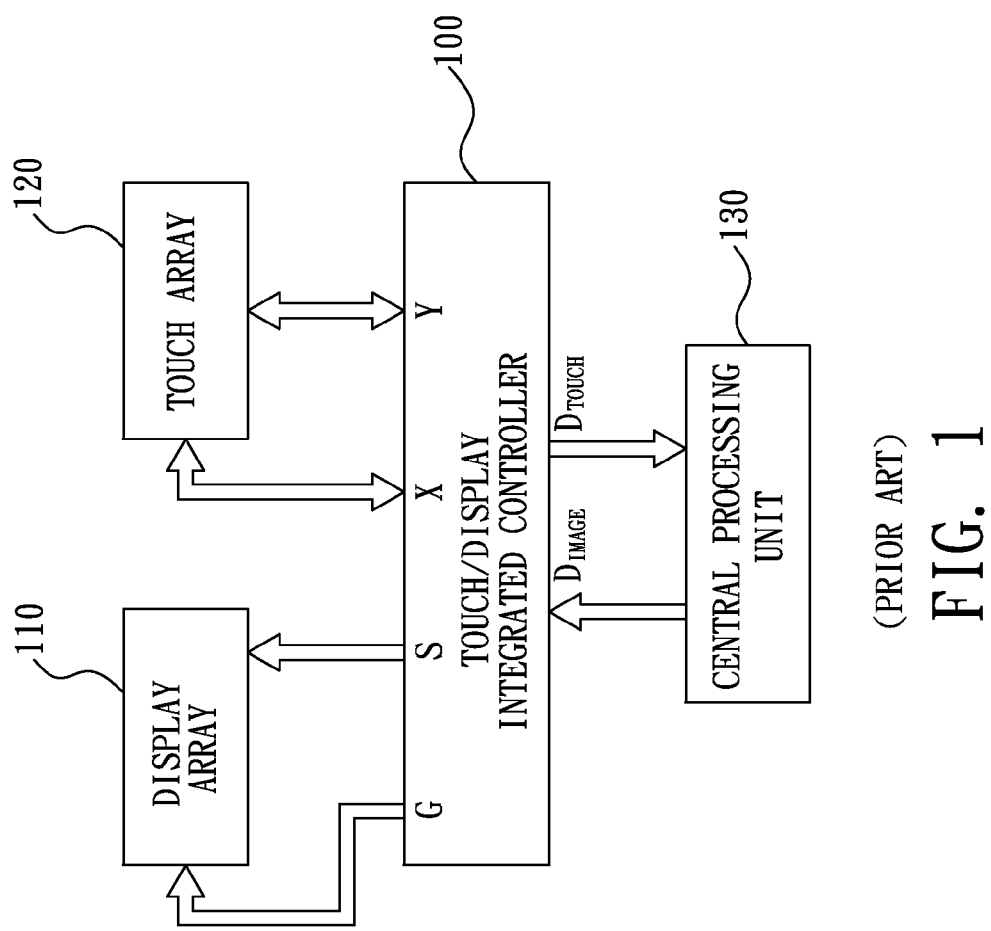
FIG. 1 illustrates a touch/display architecture using a prior art touch/display integrated controller.
Figure 2:
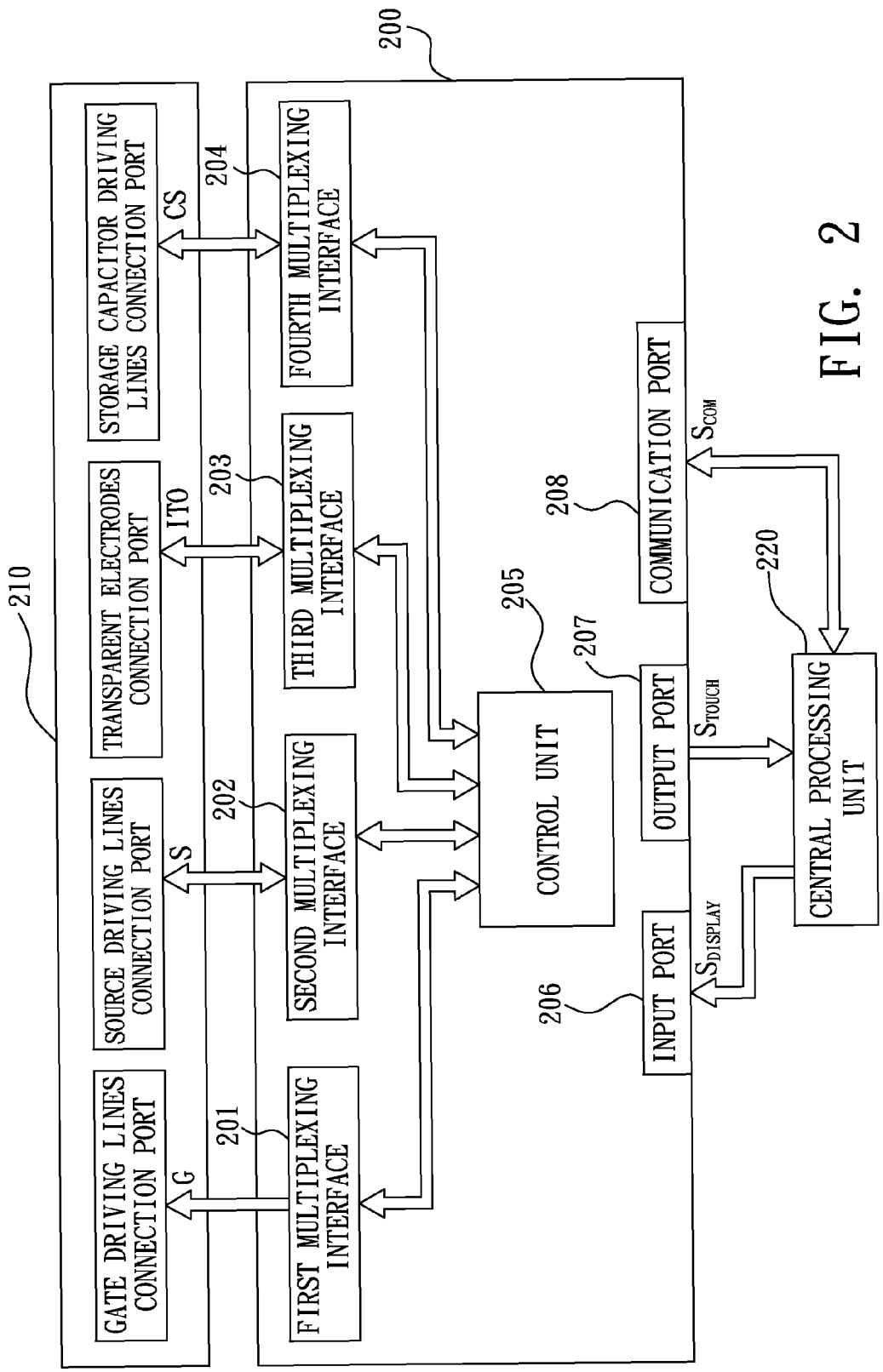
FIG. 2 illustrates a block diagram of a system having a touch/display function, the system including a preferred embodiment of a driving circuit of the present invention capable of enabling a display structure to provide a touch function.

The present invention will be described in more detail hereinafter with reference to the accompanying drawings that show the preferred embodiments of the invention. Please refer to FIG. 2, which illustrates a block diagram of a system having a touch/display function, the system including a preferred embodiment of a driving circuit of the present invention capable of enabling a display structure to provide a touch function. As illustrated in FIG. 2, a driving circuit 200 is coupled with a TFT (thin film transistor) display structure 210 and a central processing unit 220 respectively, wherein the driving circuit 200 and the TFT display structure 210 form a touch display to receive display data from the central processing unit 220 and transmit touch detection data to the central processing unit 220. The TFT display structure 210 has a gate driving lines connection port, a source driving lines connection port, a transparent electrodes connection port, and a storage capacitor driving lines connection port for communicating with the driving circuit 200 and thereby displaying images and detecting touch events. The central processing unit 220 can be located at a personal computer, a tablet computer, or any portable information processing apparatus.

The driving circuit 200 has a first multiplexing interface 201, a second multiplexing interface 202, a third multiplexing interface 203, a fourth multiplexing interface 204, a control unit 205, an input port 206, an output port 207, and a communication port 208.

The first multiplexing interface 201 is implemented by a first switch circuit and coupled with a plurality of gate signal lines G. The gate signal lines G are coupled to the gate driving lines connection port.

The second multiplexing interface 202 is implemented by a second switch circuit and coupled with a plurality of source signal lines S. The source signal lines S are coupled to the source driving lines connection port.

The third multiplexing interface 202 is implemented by a third switch circuit and coupled with a plurality of transparent electrode signal lines ITO. The transparent electrode signal lines ITO are coupled to the transparent electrodes connection port.

The fourth multiplexing interface 204 is implemented by a fourth switch circuit coupled with at least one storage capacitor signal line CS. The at least one storage capacitor signal line CS is/are coupled to the storage capacitor driving lines connection port.

The first multiplexing interface 201, the second multiplexing interface 202, the third multiplexing interface 203, and the fourth multiplexing interface 204 can be located on an integrated circuit. In another embodiment, the mentioned interfaces can be moved to the TFT display structure 210, and the switch circuits thereof can be implemented by thin film transistors.

Figure 3:
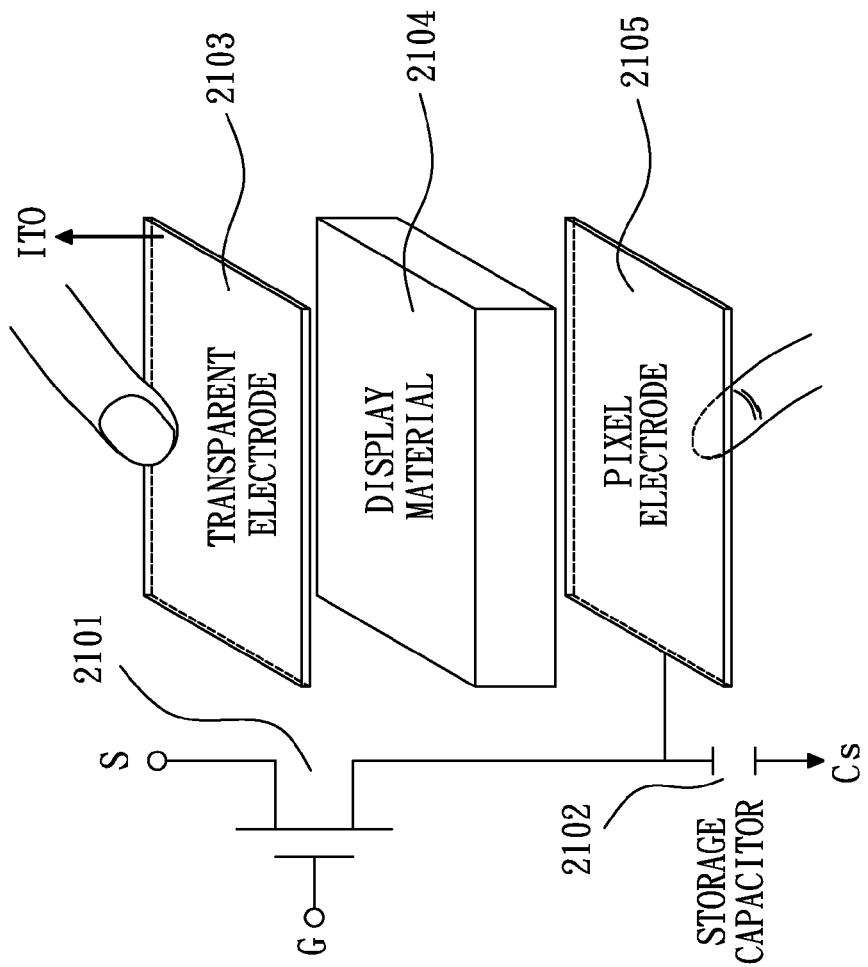
FIG. 3 illustrates a basic unit of a TFT display structure of FIG. 2.

FIG. 3 illustrates a basic unit of the TFT display structure 210. As illustrated in FIG. 3, the basic unit includes a thin film transistor 2101, a storage capacitor 2102, a transparent electrode 2103, a display material 2104, and a pixel electrode 2105.

The thin film transistor 2101 includes: a source coupled to one of the source signal lines S; a gate coupled to one of the gate signal lines G; and a drain coupled to the storage capacitor 2102 and the pixel electrode 2105.

The storage capacitor 2102 has one end coupled to the thin film transistor 2101 and the pixel electrode 2105, and another end coupled to one of the at least one storage capacitor signal line CS.

The transparent electrode 2103 is located on a top surface of the TFT display structure 210 and is coupled to one of the transparent electrode signal lines ITO. Although the transparent electrode 2103 opposes the pixel electrode 2105 in a one-on-one manner in FIG. 3, the transparent electrode 2103 can also be of a larger area to oppose multiple ones of the pixel electrode 2105.

The display material 2104, located between the transparent electrode 2103 and the pixel electrode 2105, can be a liquid crystal material or an electronic paper material.

The pixel electrode 2105 is located below the display material 2104. The transparent electrode 2103, the display material 2104, and the pixel electrode 2105 form a sandwich structure having an effective capacitance. Two neighboring ones of the transparent electrode 2103 have an effective capacitance between them. Two neighboring ones of the pixel electrode 2105 also have an effective capacitance between them.

When multiple ones of the thin film transistor 2101 are turned off, multiple ones of the transparent electrode 2103, multiple ones of the pixel electrode 2105, and multiple ones of the storage capacitor 2102 will form a first capacitor network having multiple first connection terminals, a part of the multiple first connection terminals being coupled to the transparent electrode signal lines ITO, and another part of the multiple first connection terminals being coupled to the storage capacitor signal lines CS. When the multiple ones of the thin film transistor 2101 are turned on, multiple ones of the transparent electrode 2103, multiple ones of the pixel electrode 2105, and multiple ones of the storage capacitor 2102 will form a second capacitor network having multiple second connection terminals, a first part of the multiple second connection terminals being coupled to the transparent electrode signal lines ITO, a second part of the multiple second connection terminals being coupled to the source signal lines S, and a third part of the multiple second connection terminals being coupled to the storage capacitor signal lines CS.

Besides, when the pixel electrode 2105 is implemented by a transparent conductive material, the present invention can provide another touch plane on a bottom surface.

The control unit 205 executes an image displaying procedure and a capacitive touch detection procedure alternatively. When executing the capacitive touch detection procedure, the control unit 205 uses the first multiplexing interface 201 to drive the gate signal lines G to form a capacitive network, which is the first capacitive network or the second capacitive network, on the TFT display structure 210, and uses any interface or any interface combination of a group consisting of the second multiplexing interface 202, the third multiplexing interface 203, and the fourth multiplexing interface 204 to perform the capacitive touch detection procedure on the capacitive network. The capacitive touch detection procedure is one procedure selected from a group consisting of a self-capacitive touch detection procedure, a mutual-capacitive touch detection procedure, and any combination thereof.

The self-capacitive touch detection procedure includes a charging step, a charge redistribution step, and a comparison step. In the charging step, the control unit 205 charges a sensing capacitor of the capacitive network via the second multiplexing interface 202, the third multiplexing interface 203, or the fourth multiplexing interface 204. In the charge redistribution step, the control unit 205 connects a charge-transfer capacitor in parallel with the sensing capacitor. In the comparison step, the control unit 205 uses a reference voltage to compare with a voltage on the charge-transfer capacitor. When a touch event occurs, the voltage on the charge-transfer capacitor will rise at a different speed, and the control unit 205 can thereby determine whether a touch event takes place on the sensing capacitor. As the charging step, the charge redistribution step, and the comparison step are well known, they will not be further addressed here.

The mutual-capacitive touch detection procedure includes a signal transmitting step and a signal receiving step. In the signal transmitting step, the control unit 205 outputs a voltage signal to one side of the sensing capacitor via the second multiplexing interface 202, the third multiplexing interface 203, or the fourth multiplexing interface 204. In the signal receiving step, the control unit 205 receives a sensing signal from another side of the sensing capacitor via the second multiplexing interface 202, the third multiplexing interface 203, or the fourth multiplexing interface 204. The sensing signal will have a different voltage when a touch event occurs on the sensing capacitor, and the control unit 205 can thereby determine whether a touch event takes place on the sensing capacitor. As the mutual-capacitive touch detection procedure is well known, it will not be further addressed here.

The input port 206 is used to receive display data $S_{DISPLAY}$ from the central processing unit 220.

The output port 207 is used to transmit touch detection data $S_{TOUCH}$ to the central processing unit 220.

The communication port 208 is used to exchange communication signals $S_{COM}$ with the central processing unit 220 to facilitate transmission of the display data $S_{DISPLAY}$ and the touch detection data $S_{TOUCH}$.

Figure 4:
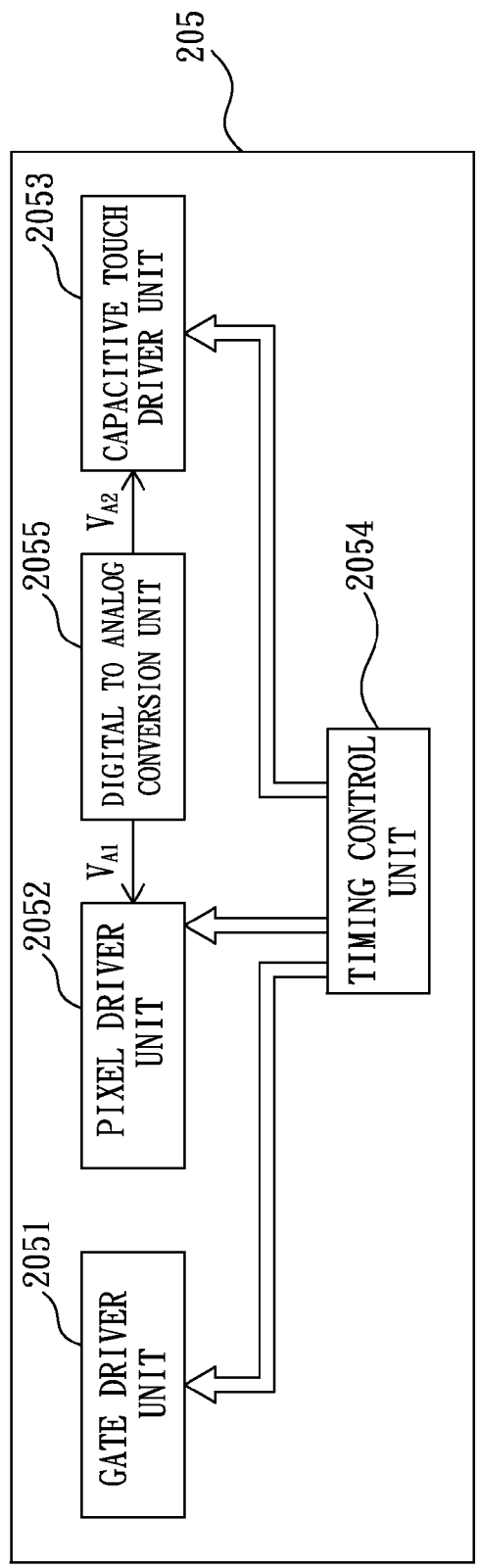
FIG. 4 illustrates a block diagram of a control unit of FIG. 2 according to a preferred embodiment of the present invention.

Please refer to FIG. 4, which illustrates a block diagram of the control unit 205 according to a preferred embodiment of the present invention. As illustrated in FIG. 4, the control unit 205 has a gate driver unit 2051, a pixel driver unit 2052, a capacitive touch driver unit 2053, a timing control unit 2054, and a digital to analog conversion unit 2055.

The gate driver unit 2051 is coupled with the first multiplexing interface 201; the pixel driver unit 2052 is coupled with the second multiplexing interface 202; the capacitive touch driver unit 2053 is coupled with the second multiplexing interface 202, the third multiplexing interface 203, and the fourth multiplexing interface 204 respectively.

The timing control unit 2054 is coupled with the gate driver unit 2051, the pixel driver unit 2052, and the capacitive touch driver unit 2053 respectively.

Figure 5A:
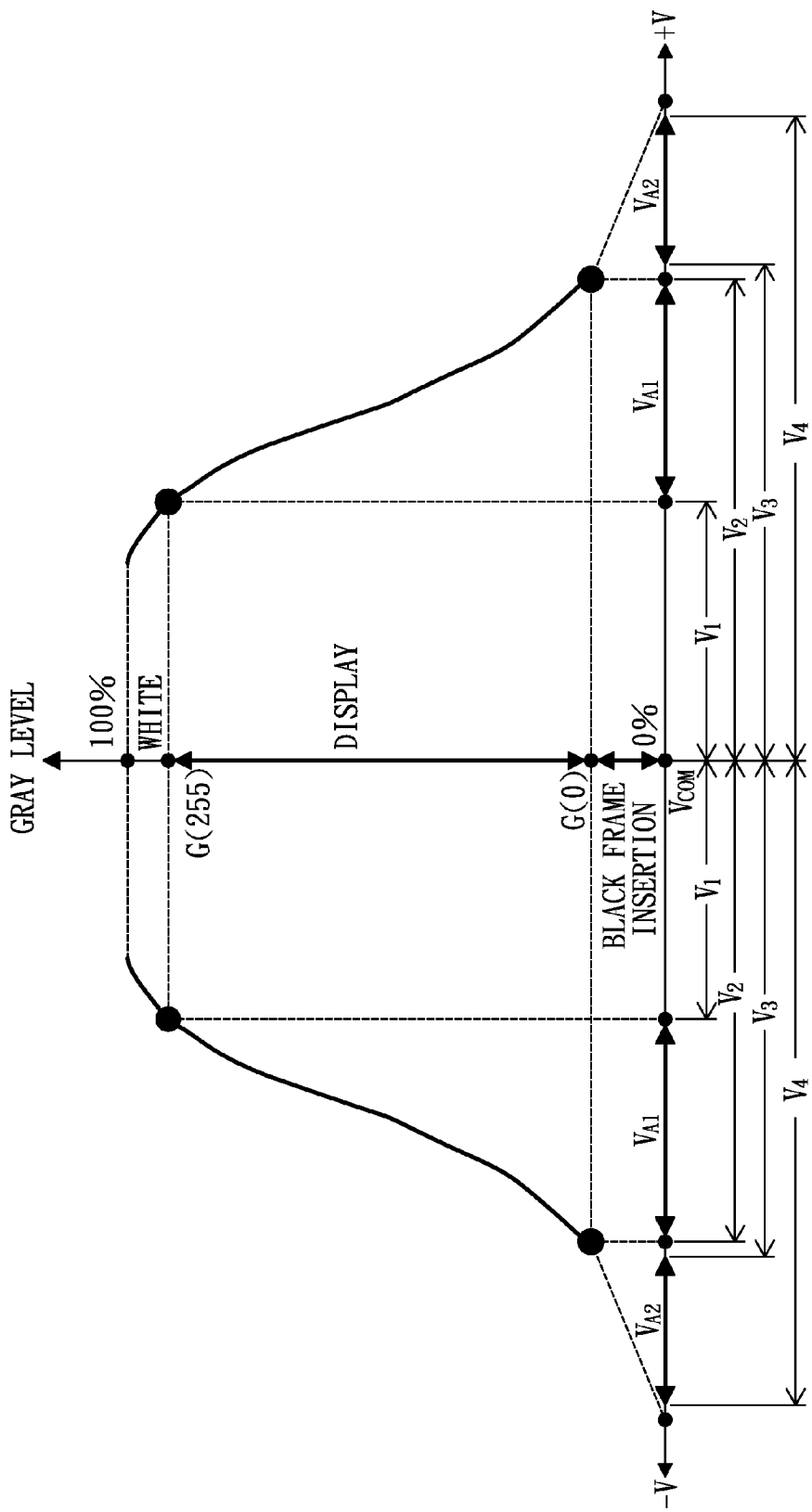
FIG. 5(a) illustrates a voltage distribution example of $V_{A1}$ and $V_{A2}$ for a normal white liquid crystal display.
Figure 5B:
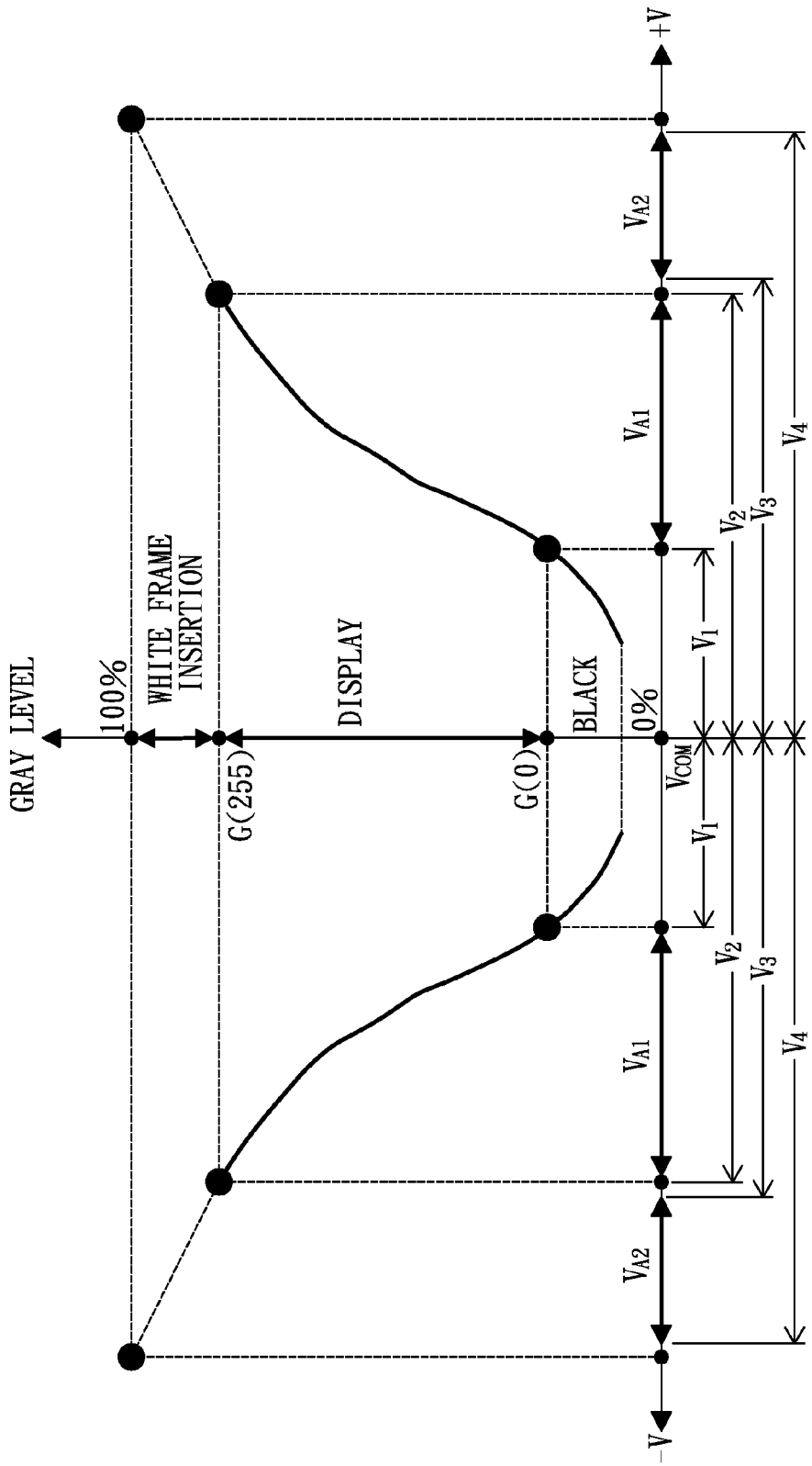
FIG. 5(b) illustrates a voltage distribution example of $V_{A1}$ and $V_{A2}$ for a normal black liquid crystal display.

The digital to analog conversion unit 2055 is used to provide a first analog voltage $V_{A1}$ to the pixel driver unit 2052 and a second analog voltage $V_{A2}$ to the capacitive touch driver unit 2053. FIG. 5($a$) illustrates a voltage distribution example of $V_{A1}$ and $V_{A2}$ for a normal white liquid crystal display; FIG. 5($b$) illustrates a voltage distribution example of $V_{A1}$ and $V_{A2}$ for a normal black liquid crystal display. As illustrated in FIG. 5($a$)-5($b$), $V_{A1}$ differs with a common voltage $V_{COM}$ by a first voltage difference, and the first voltage difference has an absolute value ranging between a first voltage V1 and a second voltage V2; $V_{A2}$ differs with the common voltage $V_{COM}$ by a second voltage difference, and the second voltage difference has an absolute value ranging between a third voltage V3 and a fourth voltage V4, wherein V2 is higher than V1, and V4 is higher than V3. The voltage range of $V_{A1}$ can be non-overlapping with that of $V_{A2}$ (as shown in FIG. 5($a$)-5($b$)) or be partly overlapping with that of $V_{A2}$. The principle thereof is to let the absolute value of the second voltage difference be located in a high voltage region so that, when the capacitive touch driver unit 2053 uses $V_{A2}$ to perform a touch detection on the capacitive network, each of the multiple effective capacitors between the multiple ones of the transparent electrode 2103 and the multiple ones of the pixel electrode 2105 can have an almost same capacitance, and the touch detection can thereby have a much better reliability.

Figure 6A:
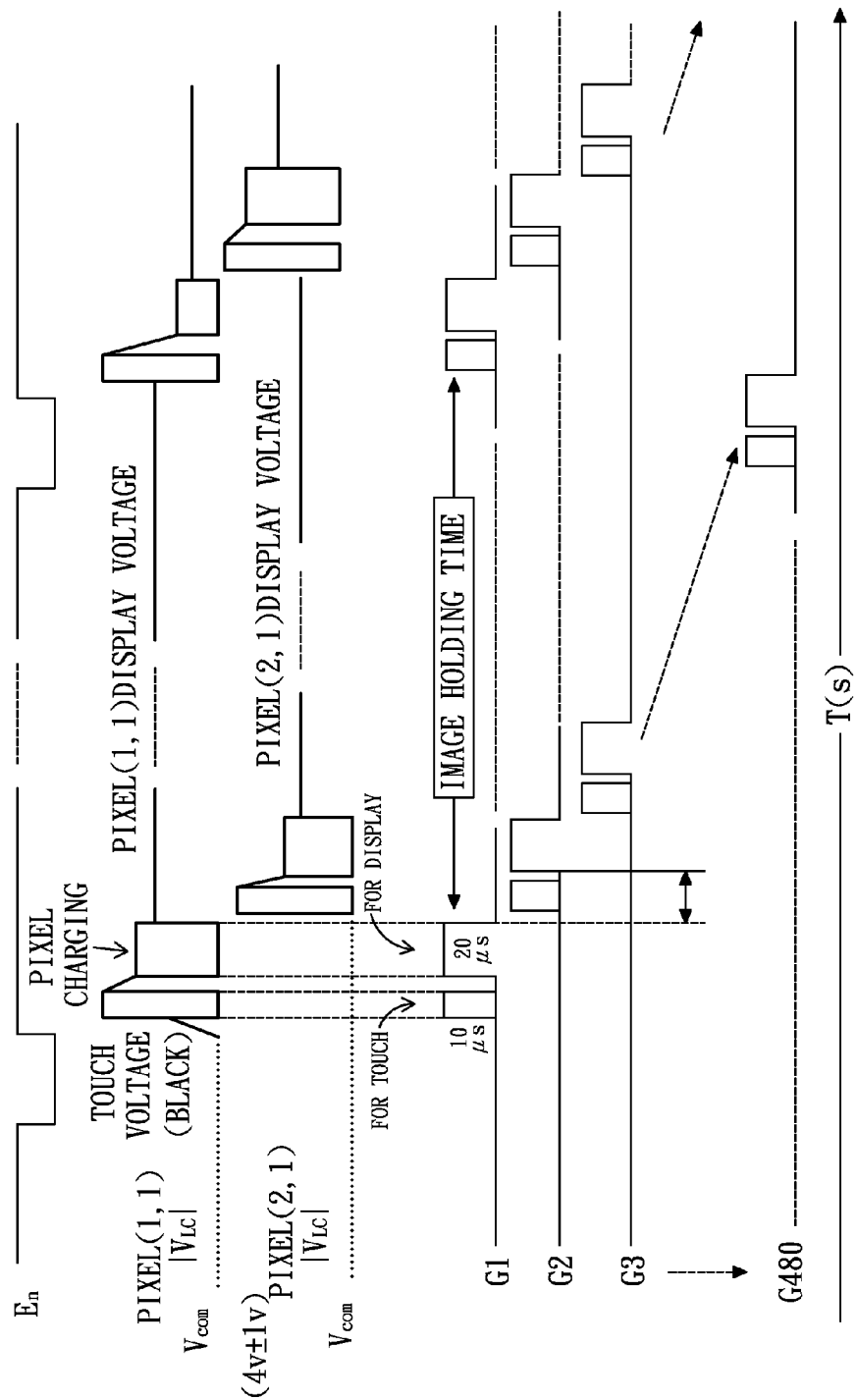
FIG. 6(a) illustrates a line scan timing diagram of the driving circuit of FIG. 2.
Figure 6B:
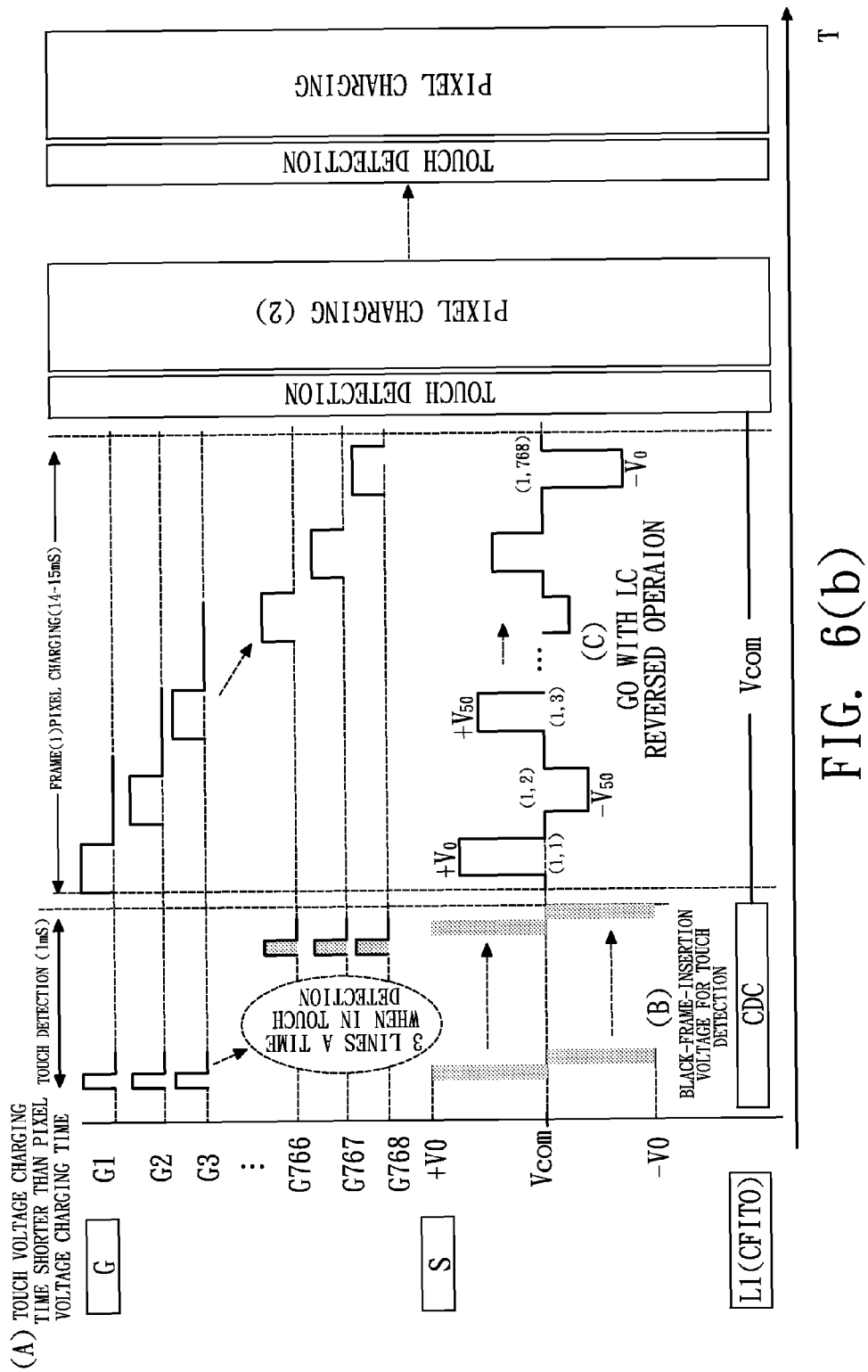
FIG. 6(b) illustrating a frame scan timing diagram of the driving circuit of FIG. 2.

The capacitive touch driver unit 2053 utilizes black frame (or white frame) insertion periods of the pixel driver unit 2052 to perform touch detection operations. As $V_{A2}$ is a black-frame-insertion voltage or a white-frame-insertion voltage, therefore, the touch detection operations can be of no impact on image displaying operations. Please refer to FIG. 6($a$)-6($b$), which illustrate timing diagrams of the driving circuit 200 performing touch detection operations and image displaying operations, with FIG. 6($a$) illustrating a line scan timing diagram of the driving circuit 200, and FIG. 6($b$) illustrating a frame scan timing diagram of the driving circuit 200. The driving circuit 200 can use the line scan timing or the frame scan timing to perform the touch detection operations and the image displaying operations.

Figure 7:
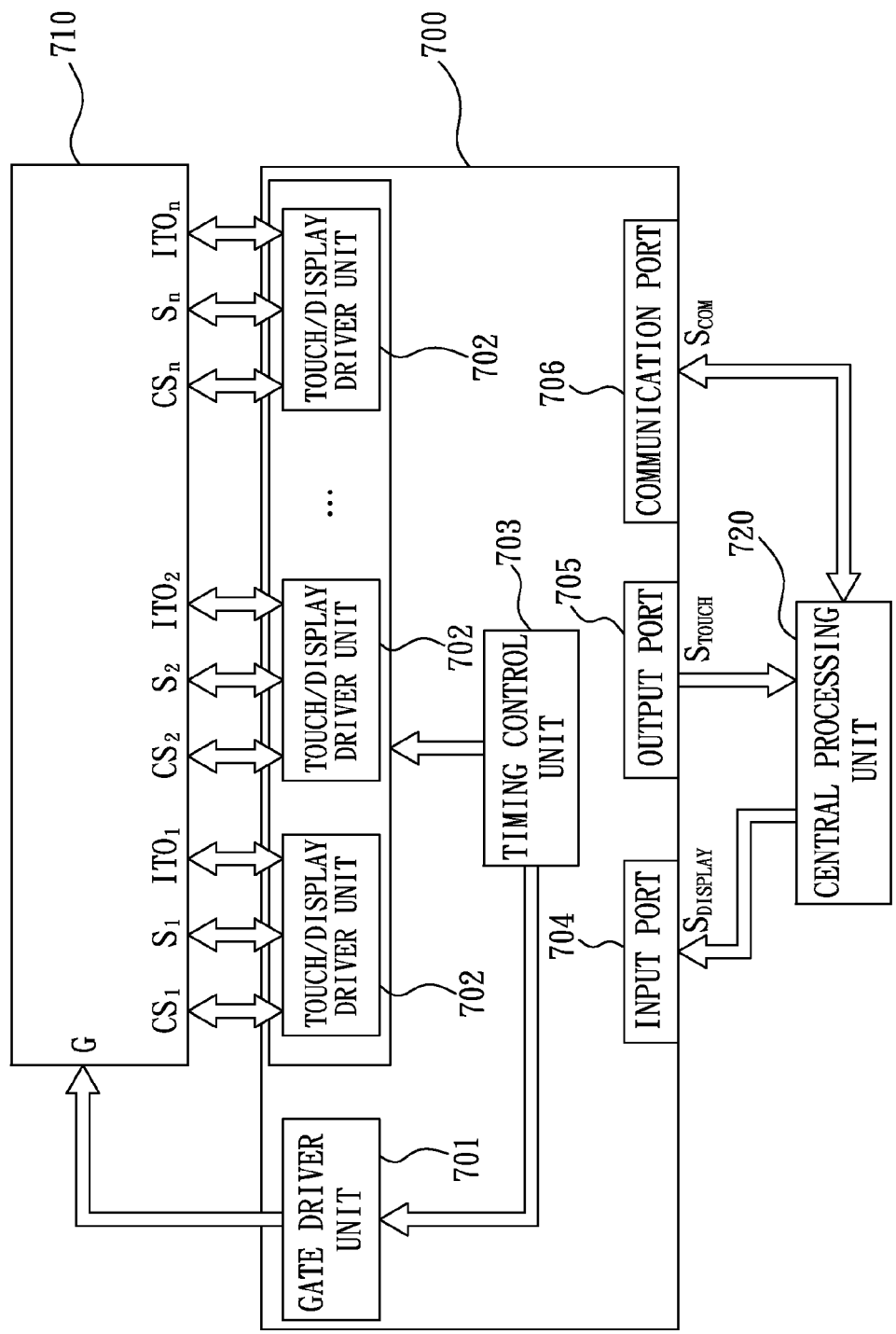
FIG. 7 illustrates a block diagram of a system having a touch/display function, the system including another preferred embodiment of a driving circuit of the present invention capable of enabling a display structure to provide a touch function.

When it needs to drive a large size TFT display structure, multiple driving circuits of the present invention can be assembled to meet the need. Please refer to FIG. 7, which illustrates a block diagram of a system having a touch/display function, the system including another preferred embodiment of a driving circuit of the present invention capable of enabling a display structure to provide a touch function. As illustrated in FIG. 7, a driving circuit 700 is coupled with a large size TFT display structure 710 and a central processing unit 720 respectively, wherein the driving circuit 700 and the large size TFT display structure 710 form a touch display to receive display data from and transmit touch detection data to the central processing unit 720. The large size TFT display structure 710 has a gate driving lines connection port G, multiple source driving lines connection ports $S_1$-$S_n$, multiple transparent electrodes connection ports $ITO_1$-$ITO_n$, and multiple storage capacitor driving lines connection ports $CS_1$-$CS_n$ for communicating with the driving circuit 700 and thereby displaying images and detecting touch events. The central processing unit 720 can be located at a personal computer, a tablet computer, or any portable information processing apparatus.

The driving circuit 700 includes a gate driver unit 701, multiple touch/display driver units 702, a timing control unit 703, an input port 704, an output port 705, and a communication port 706, wherein the multiple touch/display driver units 702 form a touch/display driver assembly.

Figure 8:
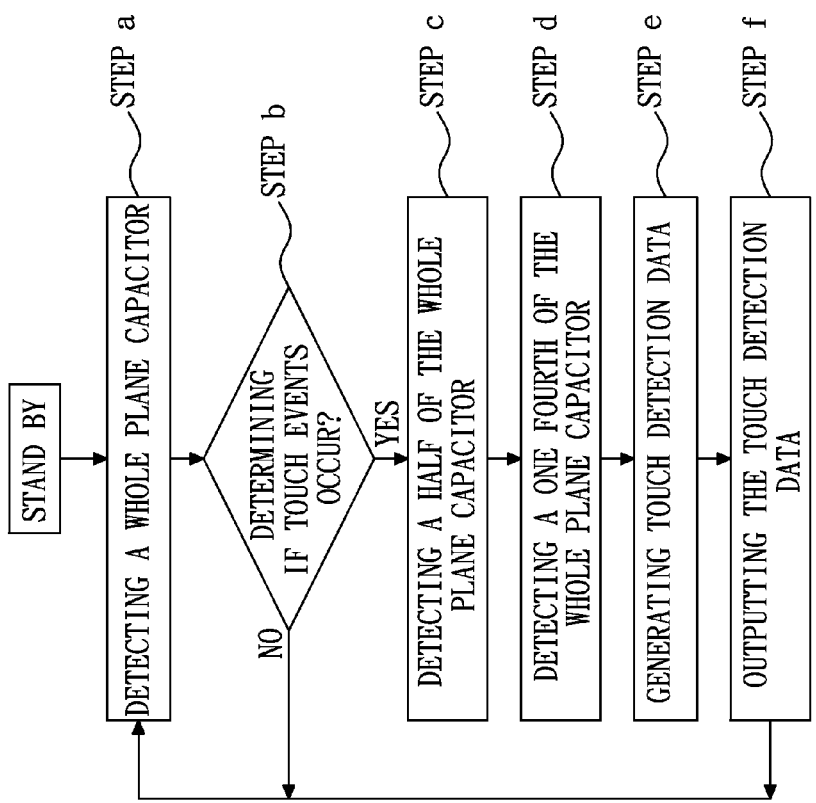
FIG. 8 illustrates a flow chart of a multi-stage touch detection procedure executed by the driving circuit of FIG. 7.

To increase the efficiency of touch detection, a multi-stage touch detection procedure can be performed on the large size TFT display structure 710. The multi-stage touch detection procedure includes steps of combining multiple sensing capacitors to alter touch resolution. For example, a resolution of 1×1 can be formed in a first stage, a resolution of 2×2 can be formed in a second stage, a resolution of 4×4 can be formed in a third stage, etc., so as to greatly reduce touch detection time. Please refer to FIG. 8, which illustrates a flow chart of a multi-stage touch detection procedure executed by the driving circuit 700. As illustrated in FIG. 8, the multi-stage touch detection procedure includes detecting a whole plane capacitor (step a), determining if touch events occur (step b), detecting a half of the whole plane capacitor (step c), detecting a one fourth of the whole plane capacitor (step d), generating touch detection data (step e), and outputting the touch detection data (step f). When step f is completed, the driving circuit 700 will go back to step a to restart the multi-stage touch detection procedure.

Thanks to the novel designs mentioned above, the present invention possesses the following advantages:

1. The driving circuit of the present invention is capable of utilizing a liquid crystal display structure to provide a touch function.

2. The driving circuit of the present invention is capable of performing a self-capacitive touch detection procedure or a mutual-capacitive touch detection procedure on a liquid crystal display structure.

3. The driving circuit of the present invention is capable of performing a multi-stage touch detection procedure on a liquid crystal display structure to reduce touch detection time.

4. The driving circuit of the present invention is capable of using a black-frame-insertion voltage in touch detection operations to avoid detection errors.

5. The driving circuit of the present invention is capable of providing a simplified structure for a touch screen to reduce the depth, the yield rate, and the cost of the touch screen.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A driving circuit (200) capable of enabling a display structure to provide a touch function, the driving circuit comprising:
    a first multiplexing interface (201) for coupling with a plurality of gate signal lines (G);
    a second multiplexing interface (202) for coupling with a plurality of source signal lines (S);
    a third multiplexing interface (203) for coupling with a plurality of transparent electrode signal lines (ITO); and
    a control unit (205) for driving said gate signal lines (G) via said first multiplexing interface (201) to form a capacitive network on a TFT display structure (210), said capacitive network including a plurality of pixel electrodes (2105) and a plurality of transparent electrodes (2103), wherein said transparent electrode (2103) is above a display material (2104) and said pixel electrodes (2105) is below said display material (2104), and performing a capacitive touch detection procedure on said capacitive network via said second multiplexing interface (202), or via both said second multiplexing interface (202) and said third multiplexing interface (203);
    said TFT display structure (210) comprising a gate driving lines connection port, a source driving lines connection port, a transparent electrodes connection port, and a storage capacitor driving lines connection port for communicating with said driving circuit (200);
    a fourth multiplexing interface (204) for coupling with at least one storage capacitor signal line (CS), and said control unit (205) further uses said fourth multiplexing interface (204) to execute said capacitive touch detection procedure;
    said first multiplexing interface (201) implemented by a first switch circuit, said second multiplexing interface (202) implemented by a second switch circuit, said third multiplexing interface (203) implemented by a third switch circuit, and said fourth multiplexing interface (204) implemented by a fourth switch circuit; and
    said TFT display structure (210) comprising a thin film transistor, said thin film transistor comprising a source coupled to one of said plurality of source signal lines (S), a gate coupled to one of said gate signal lines (G), and a drain coupled to a storage capacitor and one of said pixel electrodes (2105).

2. The driving circuit capable of enabling a display structure to provide a touch function as claim 1, further comprising an output port for transmitting touch detection data to a central processing unit.

3. The driving circuit capable of enabling a display structure to provide a touch function as claim 2, further comprising an input port for receiving display data from said central processing unit.

4. The driving circuit capable of enabling a display structure to provide a touch function as claim 3, further comprising a communication port for communicating with said central processing unit.

5. The driving circuit capable of enabling a display structure to provide a touch function as claim 1, wherein said control unit comprises:
    a gate driver unit coupled with said first multiplexing interface;
    a pixel driver unit coupled with said second multiplexing interface;
    a capacitive touch driver unit coupled with said second multiplexing interface, said third multiplexing interface, and said fourth multiplexing interface respectively; and
    a timing control unit coupled with said gate driver unit, said pixel driver unit, and said capacitive touch driver unit respectively.

6. The driving circuit capable of enabling a display structure to provide a touch function as claim 1, wherein said capacitive touch detection procedure is one procedure selected from a group consisting of a self-capacitive touch detection procedure, a mutual-capacitive touch detection procedure, and any combination thereof.

\* \* \* \* \*